United States Patent [19]

Nakano et al.

[11] Patent Number: 5,725,976
[45] Date of Patent: Mar. 10, 1998

[54] METHOD FOR MANUFACTURE OF A COLOR FILTER

[75] Inventors: Tsuyoshi Nakano, Funabashi; Reiko Sasaki, Yachiyo; Yoshikatsu Okada, Chiba, all of Japan

[73] Assignee: Sumitomo Chemical Company, Limited, Osaka, Japan

[21] Appl. No.: 786,291

[22] Filed: Jan. 22, 1997

[30] Foreign Application Priority Data

Jan. 30, 1996 [JP] Japan ................................ 8-037362
Jan. 30, 1996 [JP] Japan ................................ 8-037363

[51] Int. Cl.$^6$ ........................... G02B 5/20; G02F 1/1335
[52] U.S. Cl. ............................................................. 430/7
[58] Field of Search ................... 430/7, 321; 349/106, 349/110

[56] References Cited

U.S. PATENT DOCUMENTS

| | | | |
|---|---|---|---|
| 4,812,387 | 3/1989 | Suzuki et al. | 430/311 |
| 5,503,732 | 4/1996 | Miyazaki et al. | 205/122 |
| 5,578,403 | 11/1996 | Watanabe et al. | 430/7 |

FOREIGN PATENT DOCUMENTS 1-145626  6/1989  Japan.

*Primary Examiner*—John A. McPherson
*Attorney, Agent, or Firm*—Watson Cole Stevens Davis, P.L.L.C.

[57] ABSTRACT

A color filter comprising a transparent substrate, more than one transparent, electrically conductive circuit provided on a surface of the transparent substrate, window-shaped, colored coating films on the more than one transparent, electrically conductive circuit, and frame-shaped light-screening coating films interlaced between the window-shaped, colored coating films, the frame-shaped light-screening coating films having a larger film thickness than the window-shaped, colored coating films, which is free from the leakage of light from around each of the colored coating films so that it provides high contrast image and its method of manufacture.

2 Claims, 1 Drawing Sheet

METHOD FOR MANUFACTURE OF A COLOR FILTER

The present invention relates to a color filter, a method for manufacturing the same and a multi-color display element equipped with the same. More specifically, it relates to a color filter comprising window-shaped, colored coating films and frame-shaped light-screening coating films interlaced between the window-shaped, colored coating films; a method for manufacturing the same and a multi-color display element equipped with the same such as color liquid crystal displays (LCD).

Liquid crystal displays have so far been used for goods with a small-sized display such as the so-called pocket-sized television. However, the size of liquid crystal displays has rapidly been enlarged in recent years. The image quality of liquid crystal displays has also been improved by the development from twisted nematic (TN) liquid crystals to super-twisted nematic (STN) liquid crystals and active driving elements exemplified by thin film transistor (TFT), which has enabled the commercialization of goods with a liquid crystal display having as high image quality as cathode-ray tubes.

It is known that dyeing method, pigment dispersion method, electrodeposition method, printing method, etc. are available for producing color filters used for colorization of LCD. Of these methods, the method of producing a color filter by electrodeposition, which includes placing a substrate having electrically conductive circuits on the surface thereof and a counter electrode so as to face each other in an electrodeposition bath and applying a voltage thereto followed by heat treatment, is characterized by its simplicity of the process. In addition to the simplicity of the process, the electrodeposition method is particularly advantageous in that it permits production of color filters with colored coating films precisely formed on the substrate in high yield with low manufacturing cost.

The production of color filters by electrodeposition method is conducted, for example, according to the process disclosed in U.S. Pat. No. 4,812,387. According to the process, firstly, a transparent substrate (e.g., glass substrate) carrying transparent, electrically conductive (e.g., indium tin oxide (ITO)) circuits on the surface thereof is prepared. On the other hand, an electrodeposition bath is prepared by mixing and dispersing prescribed proportions of coloring pigments, polymer materials, solvents, etc.

The substrate is immersed in the electrodeposition bath and fixed. Colored coating films are selectively formed on the circuits on the substrate by using the electrically conductive circuits and a counter electrode as an anode and cathode, respectively, in the case of anionic electrodeposition, and applying a voltage thereto. Repetition of this electrodeposition operation several times enables formation of multi-color colored coating films.

Thereafter, the whole surface of the substrate carrying the thus formed colored coating films is coated with a black-colored negative photoresist composition. The resulting coating films are exposed to light emitted from the back side of the substrate by using the colored coating films as a photomask and developed to leave light-screening films in the gaps between the colored coating films (the so-called back exposure method), thereby obtaining a desirable color filter superior in layer flatness.

However, the colored coating films produced by this method have a continuous shape (e.g., stripe). According to the conventional electrodeposition method represented by the process of U.S. Pat. No. 4,812,387, colored coating films with non-continuous shape (e.g., window-shape), which has been strongly requested in recent years, cannot be produced.

There have been known several processes for solving the problem. U.S. Pat. No. 5,578,403 proposes a process which combines the electrodeposition method and photolithographic technique. Specifically, the process comprises coating the electrically conductive circuit-carrying surface of a transparent substrate with a photoresist composition to form a photoresist film covering the surface, patterning the formed photoresist film in frame-shape with photolithographic technique to bare the transparent electrically conductive circuits in window-shape, subjecting the resulting substrate to electrodeposition to form window-shaped colored coating films, eliminating the frame-shaped photoresist film, and forming light-screening films in the gaps between the formed colored coating films by the so-called back exposure method, to obtain a desirable color filter superior in layer flatness.

As another process combining the electrodeposition method and photolithographic technique, the process of U.S. Pat. No. 5,503,732 has been known. According to the process of this patent, a desirable color filter particularly superior in layer flatness is obtained by forming frame-shaped light-screening coating films on a transparent substrate having transparent electrically conductive circuits using a black-colored photoresist composition, and then forming window-shaped colored coating films by electrodeposition method.

These processes are industrially advantageous indeed; however, requirements for enlargement of the size of LCD with high performance still remain unsatisfied due to the remarkable development of LCD in recent years. In order to develop such a LCD meeting the requirements, it has been strongly demanded to develop a large-sized color filter of high performance, capable of providing high contrast image and free from light leakage from around window-shaped colored coating films, as well as an industrially advantageous and effective process for producing such a color filter.

After extensive attempts to develop the desirable color filter and the process for producing the same, the present inventors have completed the present invention based on the finding that the desirable color filter can be obtained by differentiating the thickness of the colored coating films and that of the light-screening coating films.

The present invention provides:
a color filter comprising:
  a transparent substrate,
  more than one transparent, electrically conductive circuit provided on a surface of the transparent substrate,
  window-shaped, colored coating films on the more than one transparent, electrically conductive circuit, and
  frame-shaped light-screening coating films interlaced between the window-shaped, colored coating films,
  the frame-shaped light-screening coating films having a larger film thickness than the window-shaped, colored coating films; and
a method for manufacturing a color filter comprising a transparent substrate; more than one transparent, electrically conductive circuit provided on a surface of the transparent substrate; window-shaped, colored coating films on the more than one transparent, electrically conductive circuit; and frame-shaped light-screening coating films interlaced between the window-shaped, colored coating films; the frame-shaped light-screening coating films having a larger film thickness than the window-shaped, colored coating films; which comprises the steps of:

(a) coating a transparent substrate having a surface carrying more than one transparent, electrically conductive circuit with a negative or positive photoresist composition capable of giving light-screening coating films to form a photoresist layer covering the surface, (b) patterning the photoresist layer photolithographically to form frame-shaped light-screening coating films which are interlaced between window-shaped bare portions and have a predetermined film thickness and a shape defined by lengthwise frames and crosswise frames of the window-shaped bare portions, the lengthwise frames of the light-screening coating films being formed at least to fill gaps formed by the more than one transparent, electrically conductive circuit and the crosswise frames of the light-screening coating films being formed to cross on the more than one transparent, electrically conductive circuit, and then (c) forming colored coating films to fill the window-shaped bare portions by electrodeposition so as to make the predetermined film thickness of the frame-shaped light-screening coating films more than that of the resulting window-shaped, colored coating films.

In FIG. 1, 1 is a transparent electrically conductive circuit.

In FIG. 2, 2 is a light-screening coating film.

Figure 1:
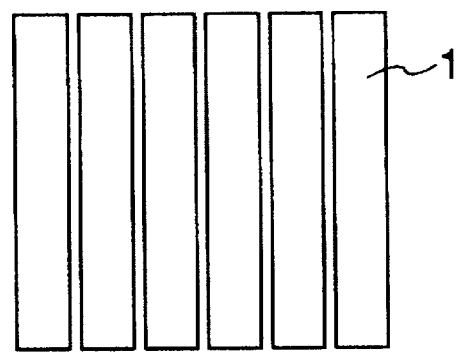
FIG. 1 is a plan schematic view of a substrate having transparent electrically conductive circuits on the surface.
Figure 2:
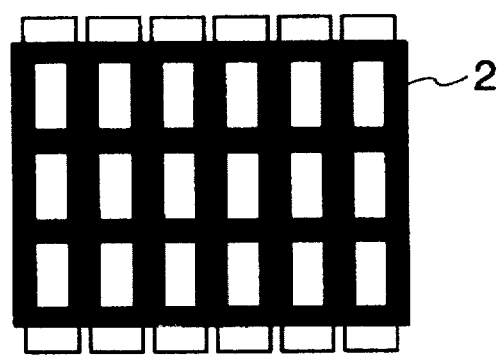
FIG. 2 is a plan schematic view of a substrate carrying frame-shaped light-screening coating films on the surface.
Figure 3A:
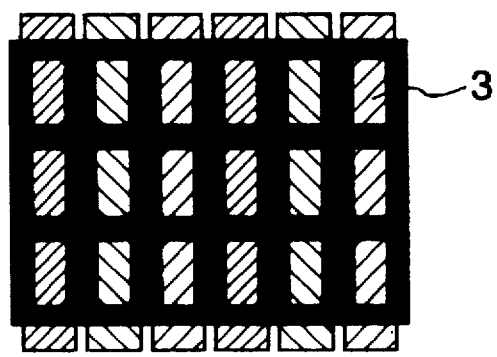
Figure 3B:
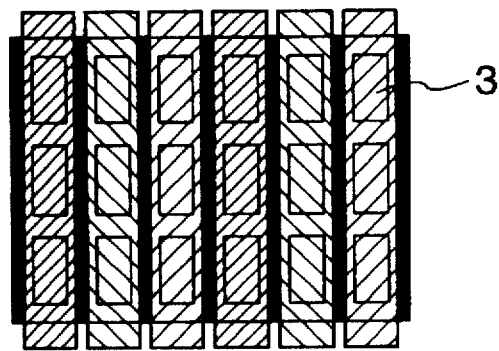

FIG. 3A and FIG. 3B are plan schematic view of the color filter of the present invention. In FIG. 3A and FIG. 3B, 3 is a colored coating film. In FIG. 3B, the colored coating films at the light-transmitting parts of the color filter is in window-shape. According to the method of the present invention, the desirable color filter can be obtained via FIG. 1, FIG. 2 and FIGS. 3A/3B in this order.

The present invention is explained in detail below.

The color filter of the present invention, which is characterized in that the light-screening coating films are thicker than the colored coating films, can be manufactured by any of the known methods so far as the light-screening coating films are formed prior to the formation of colored coating films. In the following, the method particularly preferable among these methods is explained.

The transparent substrate having more than one electrically conductive circuit provided on the surface thereof used in the present invention can be prepared according to any of the known methods. The transparent electrically conductive circuits insulated one another and having a desirable shape can be formed by forming a transparent electrically conductive layer (e.g., ITO film (tin-doped indium oxide film), NESA film (antimony-doped tin oxide film)) on a transparent substrate (e.g., glass boards, plastic boards) according to a conventional method, and processing the formed transparent electrically conductive layer with a technique such as etching.

Although the resistivity of the electrically conductive circuits is not particularly limited, a smaller resistivity is preferable. In order to improve the film thickness distribution and surface smoothness of each colored coating film by electrodeposition, the resistivity of the electrically conductive circuits is, with increasing preference, 30 Ω/□ or less, 20 Ω/□ or less and 15 Ω/□ or less. The resistivity all over the substrate is made as uniformly as possible to obtain a better result. Once these requirements concerning resistivity are met, the size of the electrically conductive circuit-carrying substrate is by no means limited in principle, so that a color filter of any large size can be obtained. The enlargement of the size of the electrically conductive circuit-carrying substrate allows to satisfy the demands for enlargement of the size of LCD as well as to improve the productivity of the color filter. These great advantages are brought by the electrodeposition method of the present invention.

In the present invention, a black-colored photoresist layer is firstly formed on a substrate having more than one transparent electrically conductive circuit. The materials used for forming the layer include negative or positive photoresist compositions obtained by dispersing a pigment giving light-screening properties (e.g., carbon black, titanium black) in a material containing an appropriate photosensitive material having heat resistance, solvent resistance, and other desirable properties (e.g., acrylic resins, polyester resins, polyimide resins). Needless to say, however, they are not limited to these compositions. They include all the materials having light-screening properties and satisfying prescribed requirements. For example, they include also commercially available black color material-containing negative or positive photoresist compositions. Specific examples thereof are CK-S234 (trade name) mfd. by Fuji Hunt Electronics Technology Co., CFPR-BK550S (trade name) mfd. by Tokyo Ohka Kogyo Co., Ltd., and V259-BKO (trade name) mfd. by Shin-Nittetsu Kagaku Co.

As the method for coating the negative or positive photoresist composition on the surface of the substrate having electrically conductive circuits, conventional screen printing method, spin coating method, roll coating method, etc. are usually adopted.

Although the thickness of the resulting photoresist layer varies depending upon the evaporation of the solvent etc. contained in the photoresist composition and/or the shrinkage of the layer by the curing etc. of the resin, it usually falls within the approximate range of from 0.2 to 10 μm. It preferably falls within the approximate range of from 1.5 to 6 μm under consideration of patterning properties of the photoresist layer, light-screening properties, the thickness of colored coating films, etc.

Subsequently, the photoresist layer is patterned with photolithographic technique to form frame-shaped light-screening coating films so as to be interlaced between window-shaped bare portions, i.e., portions where the photoresist layer above the transparent electrically conductive circuit(s) is bared in window-shape. The arrangement of the window-shaped bare portions is selected depending upon the size of LCD. For example, delta or mosaic arrangement is adopted for small-sized LCD with a size of 5 inches or less, while stripe arrangement is mainly adopted for large-sized LCD with a size of more than 5 inches.

The pattern of the light-screening coating films is in a frame-shape formed so that the frames of the light-screening coating films enclose the window-shaped bare portions. The lengthwise frames of the light-screening coating films are formed to fill gaps between the circuits. If necessary, they are formed to fill gaps between the circuits and pile up on the lengthwise corner edge of the circuits. The crosswise frames of the light-screening coating films are formed to cross on the circuits.

The pattern can easily be formed with a known photolithographic technique by exposing the substrate to light while using a photomask and developing the exposed substrate.

Although the thickness of the thus obtained light-screening coating films varies depending upon the LCD for which the color filter is used, it preferably falls within the range of from 1 to 5 μm.

Thereafter, window-shaped colored coating films are formed by electrodeposition using a substrate having on the surface thereof frame-shaped light-screening coating films formed by the method described above, so that the surface of the transparent electrically conductive circuits bared in window-shape.

The electrodeposition is carried out by using the electrically conductive circuits provided on the substrate as one electrode and a counter electrode. The counter electrode is not particularly limited in so far as it is electrically conductive and inert to the electrodeposition bath. Typical example thereof is a stainless steel plate electrode. Although the counter electrode may be a plate, it is preferably a wire netting-form electrode for improving the film thickness distribution and surface smoothness of each electrodeposited, colored coating film. The counter electrode may have a shape entirely different from that of the substrate. Preferably, however, it has the same or similar shape as that of the substrate.

The electrodeposition can be carried out in a generally known method. It includes anionic and cationic coating methods. Although the anionic and cationic coating methods are both usable in the present invention, anionic electrodeposition coating method is preferable because of smaller influence on the circuits. A resin material (binder) for the bath used in the electrodeposition includes, for example, maleinated oil type, acrylic type, polyester type, polybutadiene type and polyolefin type resin materials. These resin materials may be either thermosetting or photosensitive. They may be used either singly or in the form of mixture. Into the binder, colorants (e.g., dyes, pigments) with desirable color and other materials used in the conventional electrodeposition are appropriately compounded. The electrodeposition bath can be prepared by dispersing or dissolving ingredients such as a binder, colorants, etc. in an appropriate solvent followed by dilution. The usable solvent includes water, organic solvents, etc.

The vessel for keeping the electrodeposition bath is not particularly limited so far as the materials thereof are insulating and sufficiently durable to the electrodeposition bath. The usable vessel includes plastic vessels made of rigid polyvinyl chloride or an acrylic polymer.

The electrically conductive circuit-carrying substrate and the counter electrode are put to face each other in parallel at a distance into the electrodeposition bath described above kept in the vessel also described above. In this case, the substrate is preferably placed so that the center of the substrate faces that of the counter electrode.

In case of the anionic electrodeposition being carried out, the electrically conductive circuit-carrying substrate and the counter electrode are used as anode and cathode, respectively, so that colored coating films can be formed on the electrically conductive circuits provided on the substrate and bared in window-shape.

In the present invention, the thickness of the colored coating films formed at the window-shaped bare portions has to be smaller than that of the frame-shaped light-screening coating films formed previously. The difference between the thickness of these films is usually about 0.1 µm or more, and usually not more than about 4 µm.

The difference in film thickness can be made more remarkable by forming the colored coating films so that they pile up high on the previously formed light-screening coating films. Although the colored coating films may be formed so as to pile up high on the whole surface of the light-screening coating films (even in this case, the colored coating films at the light-transmitting parts of the resulting color filter have a window shape), they are effectively formed so that at least both of their lengthwise corner edges pile up high on the light-screening coating films. The piling up can be achieved effectively by forming the frame-shaped light-screening coating films so that the lengthwise frame of the light-screening coating films fill the gaps between the circuits and pile up on the lengthwise corner edge of the circuits. It can also be achieved by appropriately selecting the resistivity (specific resistance) of the material of the light-screening coating films.

The electrodeposition can be carried out by applying a direct current at a voltage ranging from about 10 to 300 V for about 1 second to 3 minutes, and the thickness of the colored coating films can easily be controlled by selecting the electrodeposition conditions.

After completion of the electrodeposition, it is preferred to wash the formed colored coating films thoroughly in order to remove unnecessary matters. Thereafter, if desired, the colored coating films can be heat-treated at a temperature of 100° to 280° C. for 10 to 120 minutes in order to enhance the film strength.

In the present invention, the thickness of films can be determined by any of non-contact measurements using an electron microscope, laser microscope, interference microscope, non-contacting thickness meter utilizing a critical angle method (Kosaka Laboratories Co., Ltd.), and the like; and contact measurements using DEKTAK-Type 16000 (SLOAN Co.), TENCOR Type EP-2 (TENCOR Instruments Co.), and the like. In view of the quickness and simplicity in measurement, the latter contact measurements are preferable.

According to the method described above, the color filter of the present invention, which is characterized in that the light-screening coating films have a larger film thickness than the colored coating films, can be industrially advantageously produced. Attributable to the fact that the thickness of the light-screening coating films is more than that of the colored coating films, the color filter of the present invention exhibits the following advantages (a) and (b):

(a) The color filter of the present invention is free from the leakage of light from around each of the colored coating films so that it provides high contrast image.

(b) The color filter of the present invention stabilizes the effect of spacers at the time of making a liquid crystal cell, so that it improves the uniformity of the cell gaps.

Multicolor display elements containing a LCD can easily be produced by using the color filter of the present invention through a method known per se. The thus produced multicolor display elements equipped with the color filter of the present invention are of high performance and precision, give highly uniform image and permit enlargement of the size of the display than before.

Moreover, the color filter of the present invention permits the formation of microcells by injecting liquid crystals into each of the microcells of the colored coating films independently due to the characteristics that the light-screening coating films have a larger thickness than the colored coating films. Therefore, it can be applied to the manufacture of liquid crystal display elements which can achieve wide field angles by individually controlling the orientation of the liquid crystals in the microcells.

The present invention is illustrated in more detail with reference to the following examples, which are only illustrative, but not limitative.

In the examples, the film thickness was determined by using DEKTAK-Type 16000 with a scan length of 1 mm, medium scan speed and a scan range of 20,000 Å.

EXAMPLE 1

Red, green and blue electrodeposition baths were prepared in a conventional manner by dispersing each of red, green and blue pigments, respectively, in Esbia ED-3000 Clear (an anionic polyester-containing paint for electrodeposition, manufactured and sold by Shinto Paint Co. in Japan).

There was prepared a glass substrate of 1.1 mm in thickness, 350 mm in length and 300 mm in width. The substrate had ITO circuits of 15 Ω/□ in a stripe form of 70 μm in width at a distance of 30 μm (100 μm pitch) on the surface. It also had, on the ITO circuits, light-screening coating films having open windows above the ITO circuits. The thickness of the light-screening coating films was controlled so as to be 1.8 μm after baking at 240° C. for 60 minutes.

The light-screening coating films had been provided by photolithographical patterning using a black pigment-dispersed negative photoresist composition (V259-BKO, a trade name, mfd. by Shin-Nittetsu Kagaku Co.) followed by baking and curing.

The glass substrate and a counter electrode were put into the red electrodeposition bath prepared above to face each other in parallel at a distance. The electrodeposition was carried out by applying a voltage of 50 V between the ITO circuits on the substrate and the counter electrode at 30° C. for 10 seconds so that the red-colored coating films kept a thickness of 1.8 μm, the same thickness as the light-screening coating films, after drying at 120° C. for 10 minutes. The substrate was put out of the electrodeposition bath and thoroughly washed with water. The same procedure was repeated for green and blue electrodeposition baths to complete the formation of colored coating films. The substrate provided with colored coating films was subjected to baking and curing at 260° C. for 60 minutes.

Thus, there was provided a color filter having light-screening coating films precisely formed in frame-shape with a thickness of 1.7 μm and red-, green- and blue-colored, desirable coating films, each having a thickness of 1 μm, formed precisely at the open windows of the light-screening coating films above the ITO circuits.

The liquid crystal display produced by a method known per se using this color filter was of high image quality.

EXAMPLE 2

Red, green and blue electrodeposition baths were prepared in a conventional manner by dispersing each of red, green and blue pigments, respectively, in Esbia ED-3000 Clear (an anionic polyester-containing paint for electrodeposition, manufactured and sold by Shinto Paint Co. in Japan).

There was prepared a glass substrate of 1.1 mm in thickness, 350 mm in length and 300 mm in width. The substrate had ITO circuits of 15 Ω/□ in a stripe form of 70 μm in width at a distance of 30 μm (100 μm pitch) on a surface. It also had light-screening coating films having open windows above the ITO circuits (width of the frame along the stripe of the ITO circuits: 40 μm, see FIG. 2). The thickness of the light-screening coating films was controlled so as to be 2.0 μm after baking at 240° C. for 60 minutes.

The light-screening coating films had been provided by photolithographical patterning with a photomask having a pattern which allows the formation of light-screening films at the both ends of the stripe of ITO circuits while using a black pigment-dispersed negative photoresist composition (CK-S171, a trade name, mfd. by Fuji Hunt Electronics Technology Co.) followed by baking and curing.

The glass substrate and a counter electrode were put into the red electrodeposition bath prepared above to face each other in parallel at a distance. The electrodeposition was carried out by applying a voltage of 50 V between the ITO circuits on the substrate and the counter electrode at 30° C. for 10 seconds so that the red-colored coating films kept a thickness of 2.0 μm, the same thickness as the light-screening coating films, after drying at 120° C. for 10 minutes. The substrate was put out of the electrodeposition bath and thoroughly washed with water. The same procedure was repeated for green and blue electrodeposition baths to complete the formation of colored coating films. The substrate provided with colored coating films was subjected to baking and curing at 260° C. for 60 minutes.

Thus, there was provided a color filter having light-screening coating films precisely formed in frame-shape with a thickness of 1.8 μm and red-, green- and blue-colored, desirable coating films, each having a thickness of 1.2 μm, formed precisely at the open windows of the light-screening coating films above the ITO circuits, the colored coating films also being piled up with an approximate thickness of 1 μm on the light-screening coating films at the portions where they contact each other (see FIG. 3).

The liquid crystal display produced by a method known per se using this color filter was of high image quality.

What is claimed is:

1. A method for manufacturing a color filter comprising a transparent substrate; more than one transparent, electrically conductive circuit provided on a surface of the transparent substrate; window-shaped, colored coating films on the more than one transparent, electrically conductive circuit; and frame-shaped light-screening coating films interlaced between the window-shaped, colored coating films; the frame-shaped light-screening coating films have a larger film thickness than the window-shaped, colored coating films; which comprises the steps of:

(a) coating a transparent substrate having a surface carrying more than one transparent, electrically conductive circuit with a negative or positive photoresist composition capable of giving light-screening coating films to form a photoresist layer covering the surface, (b) patterning the photoresist layer photo-lithographically to form frame-shaped light-screening coating films which are interlaced between window-shaped bare portions and have a predetermined film thickness and a shape defined by lengthwise frames and crosswise frames of the window-shaped bare portions, the lengthwise frames of the light-screening coating films being formed at least to fill gaps formed by the more than one transparent, electrically conductive circuit and the crosswise frames of the light-screening coating films being formed to cross on the more than one transparent, electrically conductive circuit, and then (c) forming colored coating films to fill the window-shaped bare portions by electrodeposition so as to make the predetermined film thickness of the frame-shaped light-screening coating films more than that of the resulting window-shaped, colored coating films, wherein step (c) includes the step of carrying out the electrodeposition to form window-shaped, colored coating films which at least have lengthwise corner edges piling up high on the light-screening coating films.

2. The method according to claim 1, wherein step (b) includes the step of forming the lengthwise frames of the light-screening coating films to fill gaps formed by the more than one transparent, electrically conductive circuit and pile up on the more than one transparent, electrically conductive circuit at lengthwise corner edge.

* * * * *